United States Patent [19]
Oglesby et al.

[11] Patent Number: 5,215,076
[45] Date of Patent: Jun. 1, 1993

[54] GAS POWERED HEATING TOOL

[75] Inventors: John P. Oglesby, Anneville; Alfred P. Oglesby, Carlow; Damian Brett, Crossneen; John P. Watmore, Bennettsbridge, all of Ireland

[73] Assignee: Oglesby & Butler Research & Development Ltd., Carlow, Ireland

[21] Appl. No.: 782,552

[22] Filed: Oct. 25, 1991

[30] Foreign Application Priority Data

Oct. 26, 1990 [IE] Ireland ................................. 3854/90

[51] Int. Cl.⁵ ................................................ B23K 3/00
[52] U.S. Cl. ................................ 126/413; 126/401; 126/404; 126/238; 431/268
[58] Field of Search ............... 126/413, 401, 403, 404, 126/406, 407, 414, 238, 239; 431/328, 354, 329, 268; 228/51

[56] References Cited

U.S. PATENT DOCUMENTS

| | | | |
|---|---|---|---|
| 4,133,301 | 1/1979 | Fujiwara | 126/413 |
| 4,716,885 | 1/1988 | Zaborowski | 126/413 |
| 4,785,793 | 11/1988 | Oglesby et al. | 126/413 X |
| 4,890,595 | 1/1990 | Fischer | 126/65 EM |
| 4,911,143 | 3/1990 | Pivot et al. | 126/413 X |
| 5,007,405 | 4/1991 | Hsu | 126/413 X |

FOREIGN PATENT DOCUMENTS

588988 6/1947 United Kingdom.

Primary Examiner—Larry Jones
Attorney, Agent, or Firm—Sughrue, Mion, Zinn, Macpeak & Seas

[57] ABSTRACT

A gas powered heating tool comprises a handle and a head which comprises a soldering tool element. Gas from a reservoir in the handle is delivered through a gas supply pipe to a combustion chamber where it is converted to heat by a catalytic heating element for heating the tool element. A nozzle orifice in a nozzle delivers a jet of gas through the gas supply pipe. The gas supply pipe conducts heat from the combustion chamber to a heat transfer member which in turn conducts heat to the nozzle to prevent freezing of gas in the nozzle orifice. Heat is also conducted to gas supply control means in the handle to prevent gas freezing.

19 Claims, 7 Drawing Sheets

GAS POWERED HEATING TOOL

FIELD OF THE INVENTION

The present invention relates to a heating tool, and in particular, to a gas powered heating tool, such as, for example, a soldering tool, a heated knife or the like. The invention also relates to a head for the heating tool.

BACKGROUND TO THE INVENTION

Gas powered heating tools, for example, soldering irons, may comprise a handle within which a refillable reservoir for fuel gas is located. A tool head, which comprises a tool element, for example, a soldering tool bit, a desoldering tool bit, a knife or the like is heated by a catalytic heating element which is mounted in a combustion chamber adjacent the tool element. A gas supply pipe supplies gas to the combustion chamber. The gas supply pipe is connected to the handle, and a valve or other gas regulator is provided in the handle for delivering gas from the fuel reservoir to the gas supply pipe. In general, gas is delivered to the combustion chamber from a nozzle with a relatively small orifice. Where a relatively high demand for heat exists, the flow rate of gas through the nozzle orifice is high. Accordingly, in such cases, it is necessary for the gas to pass through the nozzle orifice at a relatively high velocity. Where such high velocities are maintained over an extended period, it has been found that freezing of the gas in the nozzle occurs. This thus limits the maximum rate at which heat can be provided to the tool element. Where gas supply means are provided for controlling the supply of gas to the nozzle, freezing of gas may also occur in the gas supply control means.

There is therefore a need for a gas powered heating tool which overcomes these problems. There is also a need for a head for such a gas powered heating tool.

OBJECTS OF THE INVENTION

One object of the invention is to provide a gas powered heating tool in which freezing of gas passing through the nozzle is avoided. Another object of the invention is to provide a gas powered heating tool in which the nozzle is remotely mounted of the combustion chamber and freezing of gas passing through the nozzle is avoided. A further object of the invention is to provide a gas powered heating tool in which freezing of gas passing through gas supply control means of the heating tool is avoided.

SUMMARY OF THE INVENTION

According to the invention, there is provided a gas powered heating tool comprising a handle, a tool element connected to the handle, a combustion chamber mounted adjacent the tool element for heating the tool element, a catalytic heating element mounted in the combustion chamber for converting gas to heat, a gas supply pipe extending from the combustion chamber for delivering gas to the combustion chamber, a nozzle for delivering gas to the combustion chamber through the gas supply pipe, and main heat transfer means for transferring heat from the combustion chamber to the nozzle to prevent freezing of gas passing therethrough. Preferably, the nozzle is remotely mounted of the combustion chamber. Advantageously, the nozzle is mounted in the handle.

In one embodiment of the invention, the main heat transfer means comprises a heat transfer member engagable with the nozzle. Preferably, the main heat transfer means is of heat conducting material and is engagable with the nozzle with heat conducting engagement. Preferably, the heat transfer member is a tubular member having a bore extending therethrough for delivering gas from the nozzle. Advantageously, a venturi is formed in the bore of the heat transfer member, the nozzle being located upstream of the venturi.

In one embodiment of the invention, an air intake means is provided to the bore of the heat transfer member. Advantageously, the air intake means is provided intermediate the nozzle and the venturi.

Preferably, the gas supply pipe supplying gas to the combustion chamber acts as part of the main heat transfer means and is of heat conducting material. Advantageously, the heat transfer member slidably engages a bore of the gas supply pipe with heat conducting engagement.

In a further embodiment of the invention, gas supply control means for controlling the gas supply to the nozzle is provided in the handle, secondary heat transfer means being provided to transfer heat from the main heat transfer means to the gas supply control means to prevent freezing of gas passing through the gas supply control means. Preferably, the secondary heat transfer means carries the nozzle and the gas supply control means.

In one embodiment of the invention, the gas supply control means comprises a valving member for controlling the supply of gas to the nozzle, the secondary heat transfer means, the nozzle and the valving member being slidable in the handle for controlling the supply of gas to the nozzle.

In another embodiment of the invention, the handle acts partly as the secondary heat transfer means.

In one embodiment of the invention, the gas supply pipe is releasably engagable with the handle and extends therefrom.

In another embodiment of the invention, a portion of the gas supply pipe adjacent a distal end thereof remote from the handle forms the combustion chamber, and the tool element is engagable with the distal end of the gas supply pipe to form therewith the combustion chamber. Preferably, an exhaust outlet means is provided from the combustion chamber, the exhaust outlet means being provided by an elongated exhaust outlet slot, the elongated slot being of width in the range of 2 mm to 5 mm and length in the range of 5 mm to 15 mm. Advantageously, the thickness of the wall of the combustion chamber defining the exhaust outlet slot is in the range of 0.1 mm to 1 mm.

In a further embodiment of the invention, a reservoir for fuel gas is formed in the handle, fuel being delivered from the fuel gas reservoir to the nozzle through the valving member.

In one embodiment of the invention, the tool element is a soldering tool element. In another embodiment of the invention, the tool element is a desoldering tool element. In another embodiment of the invention, the tool element is a knife. In another embodiment of the invention, the tool element is a warm air delivery nozzle.

Additionally, the invention provides a head for a gas powered heating tool according to the invention, the head comprising a tool element, a combustion chamber mounted adjacent the tool element for heating the tool element, a gas catalytic combustion heating element mounted in the combustion chamber for converting gas to heat, a gas supply pipe extending from the combustion chamber for delivering gas to the combustion chamber, the gas supply pipe comprising releasable connecting means for releasably connecting the head to a handle of the gas powered heating tool.

In one embodiment of the invention, portion of the gas supply pipe adjacent one end thereof forms the combustion chamber, the tool element being engagable with the gas supply pipe adjacent the said end for closing the combustion chamber.

In another embodiment of the invention, the catalytic heating element is of tubular construction having an internal bore extending therethrough for receiving gas from the gas supply pipe, the catalytic heating element being mounted in the combustion chamber so that gas in the internal bore passes radially outwardly through the heating element.

In a further embodiment of the invention, exhaust outlet means is provided in the wall of the combustion chamber for facilitating radial flow of gas through the catalytic heating element.

In a further embodiment of the invention, the exhaust outlet means comprises an elongated outlet slot, the slot being of width in the range of 2 mm to 5 mm and length in the range of 5 mm to 15 mm. Preferably, the thickness of the wall of the combustion chamber defining the exhaust outlet slot is in the range of 0.1 mm to 1 mm.

ADVANTAGES OF THE INVENTION

The advantages of the invention are many. A particularly important advantage of the invention is that freezing of gas passing through the nozzle is avoided. Indeed, freezing of the gas passing through the nozzle is avoided, almost irrespective of the rate at which gas passes through the nozzle. This advantage is achieved by virtue of the fact that heat is transferred through the heat transfer member from the combustion chamber to the nozzle. This heat transfer is further facilitated by virtue of the fact that the gas supply pipe is of a heat conducting material and conducts heat from the combustion chamber to the heat transfer member. A further advantage of the invention is that freezing of gas passing through the gas control supply means is also avoided. This is achieved by virtue of the fact that the secondary heat transfer means transfers some of the heat conducted into the nozzle to the gas supply control means. Where the carrier member carrying the nozzle and the valving member acts as the secondary heat transfer means, a particularly advantageous form of the invention is provided.

These and other advantages and objects of the invention will be readily apparent to those skilled in the art from the following description of a preferred embodiment thereof, which is given by way of example only, with reference to the accompanying drawings.

DETAILED DESCRIPTION OF THE INVENTION

Referring to the drawings, there is illustrated a gas powered heating tool according to the invention indicated generally by the reference numeral 1. The gas powered heating tool comprises a handle 2 and is provided with a plurality of interchangeable heads 3 which are releasably engagable with the handle 2. Only two heads 3 are illustrated, namely, a soldering head 3a, see FIGS. 11 and 12, and a heated knife head 3b, see FIG. 13. However, it is envisaged that the gas powered heating tool may be provided with any one or more of the following heads, namely, a soldering head,
  a desoldering head,
  a heated knife for cutting, for example, plastics materials, plastic ropes and the like,
  a warm air blower for blowing warm air at a plastics sleeve, for shrinking the sleeve onto a cable connector or the like.

Needless to say, other desired types of tool heads may be provided.

The handle 2 is hollow and of plastics material and defines a bore 4 extending longitudinally through the handle 2 from an upstream end 5 to a downstream end 6. The upstream end 5 of the bore 4 forms a refillable reservoir 8 for fuel gas. Internal ribs 9 extending into the reservoir 8 reinforce the handle 2 in the area of the reservoir 8. An end cap 10 closes the upstream end 5 of the bore 4 to form the reservoir 8. A filling valve mechanism 11 is provided in the end cap 10 for filling the reservoir 8. Gas supply control means for controlling the supply of gas from the reservoir 8 to the head 3 is mounted in the handle 2. The gas supply control means comprises a fixed flow pressure reducer evaporator 12 for evaporating fuel from the reservoir to gas. The evaporator 12 is mounted in a portion of the bore 4 which forms an outlet 14 of circular cross section from the reservoir 8. The evaporator 12 is described in more detail below. The gas supply control means also comprises a carrier member 16 slidable in the bore 4 as will be described below. The carrier member 16 carries a valving member 18 which also forms portion of the gas supply control means for opening and closing a valve outlet 18 from the evaporator 12 for delivering and isolating a supply of fuel gas from the reservoir 8 to the head 3. A nozzle 15 carried on and slidable with the carrier member 16 defines a nozzle orifice 19 which delivers gas to the head 3, as will be described below.

Figures 1, 11, 13:
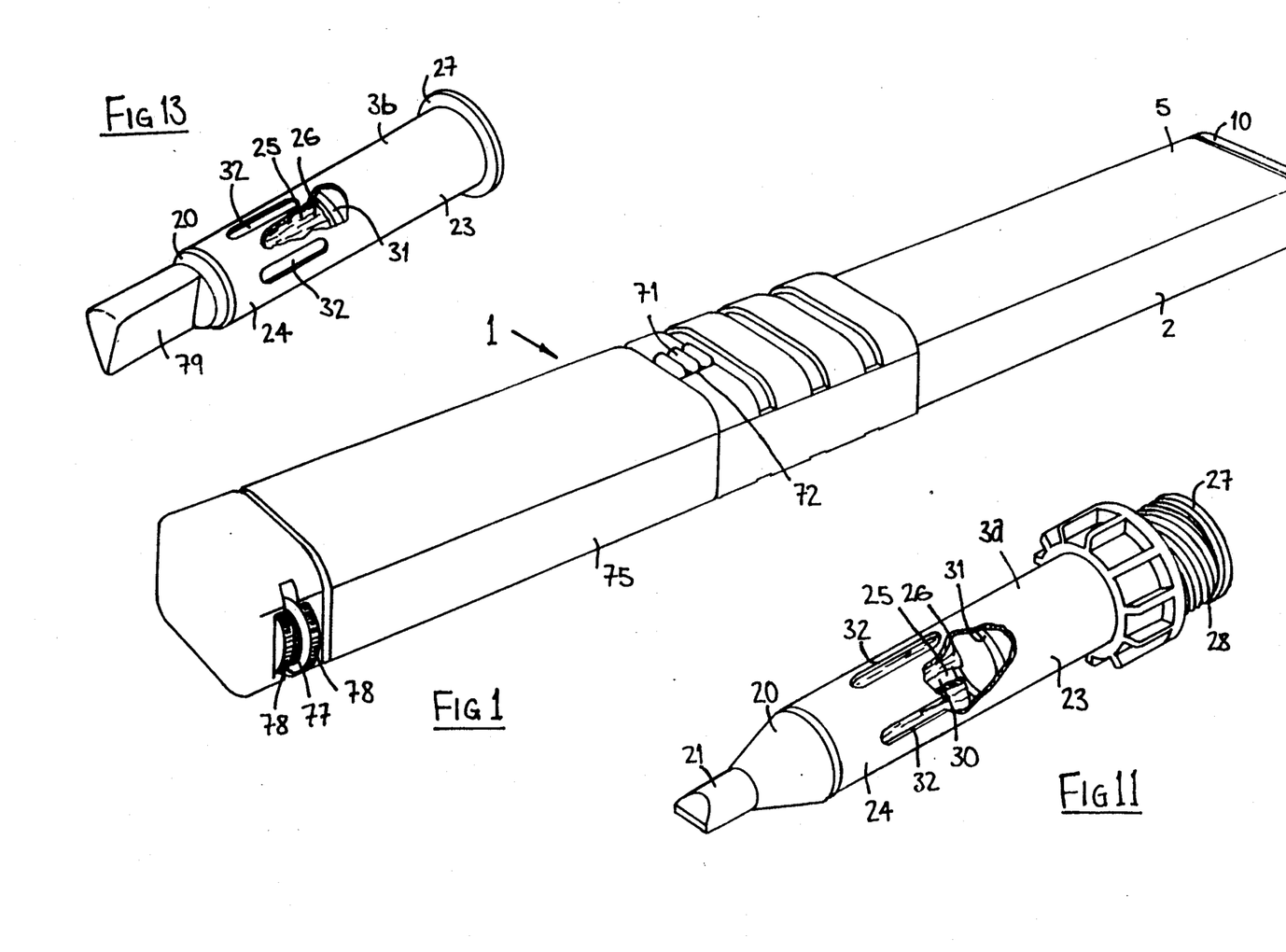
FIG. 1 is a perspective view of a gas powered heating tool according to the invention.
FIG. 11 is a perspective view of portion of the gas powered heating tool of FIG. 1.
FIG. 13 is a perspective view of an alternative portion to that of FIGS. 11 and 12 of the gas powered heating tool of FIG. 1.
Figures 2, 9, 12:
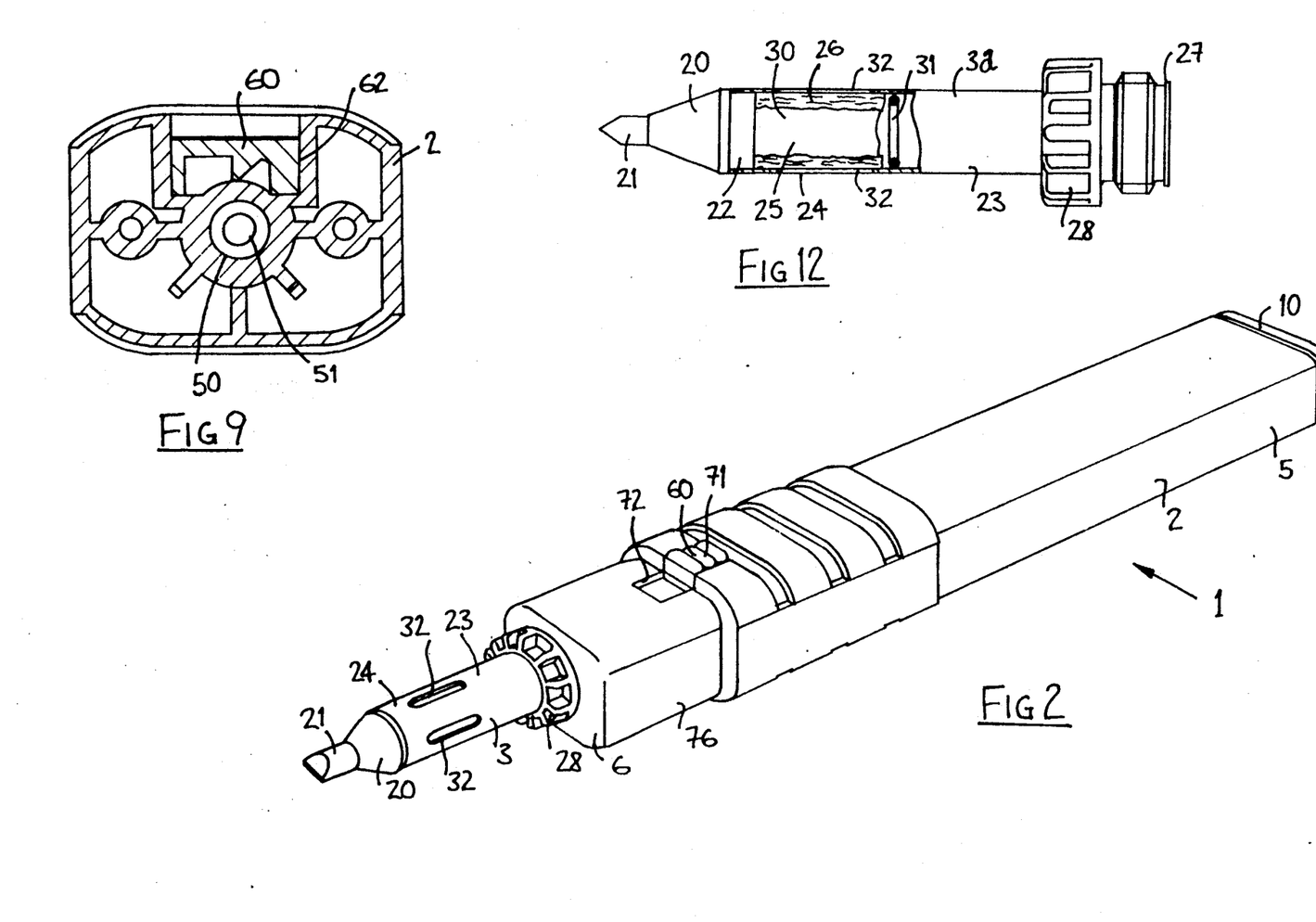
FIG. 2 is a perspective view of the gas powered heating tool of FIG. 1 with portion of the tool removed.
FIG. 9 is a sectional end elevational view of the gas powered heating tool of FIG. 1 on the line IX—IX of FIG. 6.
FIG. 12 is a partly sectional side view of the portion of the gas powered heating tool of FIG. 11.
Figure 3:
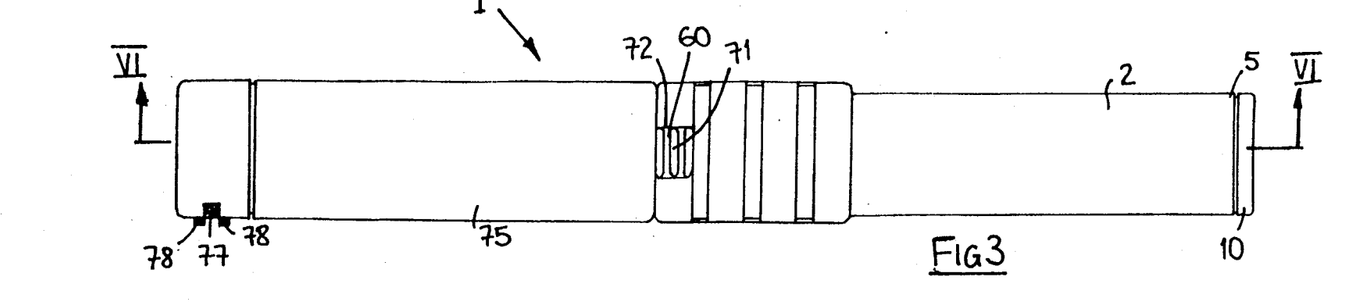
FIG. 3 is a plan view of the gas powered heating tool of FIG. 1.
Figure 4:
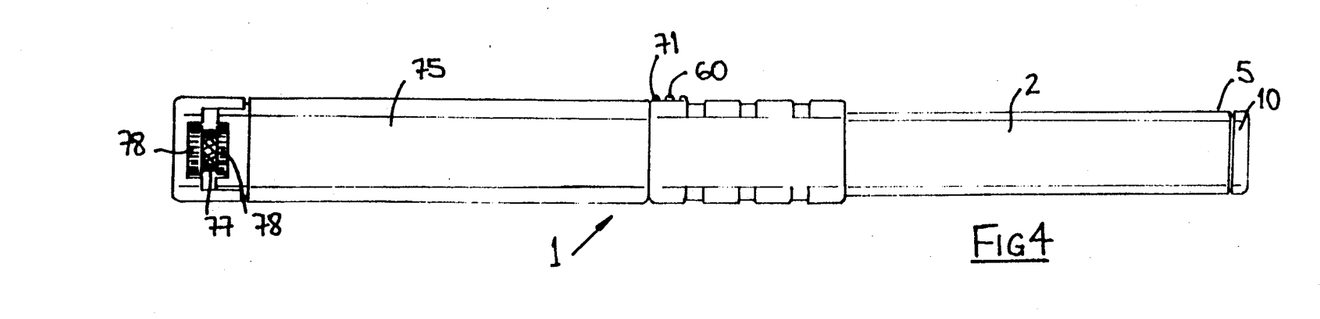
FIG. 4 is a side elevational view of the gas powered heating tool of FIG. 1.
Figure 5:
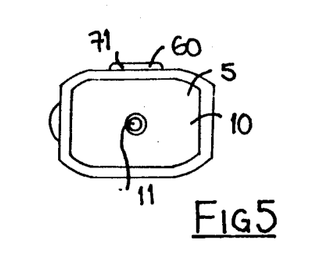
FIG. 5 is an end view of the gas powered heating tool of FIG. 1.

Referring initially to the soldering head 3a of FIGS. 11 and 12, the head 3 comprises a tool element 20 of heat conductive material, namely, brass, which terminates in a soldering tip 21. A spigot 22 formed integrally with and extending from the tool element 20 engages a gas supply pipe 23 with a tight interference fit. The gas supply pipe 23 defines at its distal end 24 remote from the handle 2 a combustion chamber 25 which is closed by the spigot 22. A porous catalytic heating element 26 of fibrous material, in this case alumina fibre, which carries a precious metal catalyst, namely, platinum, is of tubular construction and is placed in the combustion chamber 25 for converting gas supplied from the nozzle 15 to heat for heating the tool element 20. The gas supply pipe extends from the combustion chamber 25 and terminates in a flange 27. A gland nut 28 releasably secures the gas supply pipe 23 in a socket 29 formed by the bore 4 through the handle 2, see FIG. 7. Gas from the nozzle orifice 19 of the nozzle 15, as will be described below, is delivered into the gas supply pipe 23 and in turn through a bore 30 formed by the tubular catalytic heating element 26. The gas then evenly diffuses radially through the catalytic heating element 26. Exhaust outlet means for exhausting exhaust gases from the combustion chamber 25 comprises four elongated exhaust outlet slots 32 equispaced circumferentially around the gas supply pipe 23 which are each of approximately 10 mm long by 2 mm wide and terminate in radiused ends. The size and location of the outlet slots 32 facilitate in an even diffusion of gas through the catalytic heating element 26. The gas supply pipe 23 is of heat conducting material, namely, stainless steel, and is of circular cross section of 0.25 mm wall thickness. By virtue of the fact that the spigot 22 of the tool element 20 engages the gas supply pipe 23 with an interference fit, the tool element 20 and gas supply pipe 23 are in heat conductive engagement. Accordingly, heat generated by the catalytic heating element 26 is conducted from the gas supply pipe 23 to the tool element 20. An outwardly biased circular spring clip 31 is mounted in the gas supply pipe 23 for retaining the catalytic heating element 26 in the portion of the gas supply pipe 23 which forms the combustion chamber 25.

The nozzle 15 is machined from a heat conducting material, namely, brass. A main heat transfer means for conducting heat from the combustion chamber 25 to the nozzle 15 to prevent freezing of gas in the nozzle orifice 19 comprises a tubular heat transfer member 35 of heat conducting material, namely, glass filled plastics material, namely, polyphenylene sulphide PPS. The heat transfer member 35 defines a bore 36 extending therethrough for delivering fuel gas from the nozzle orifice 19 into the gas supply pipe 23. An annular recess 37 extending into the bore 36 rigidly engages a circular flange 34 of brass machined integrally with the nozzle 15 so that the heat transfer member 35 slides with the nozzle 15 and the carrier member 16. The rigid engagement of the flange 34 in the annular recess 37 facilitates heat conduction from the heat transfer member 35 to the nozzle 15. Portion of the bore 36 through the heat transfer member 35 forms a venturi 38. A portion of the heat transfer member 35 upstream of the venturi 38 is removed to form an air inlet 39 intermediate the nozzle orifice 19 and the venturi 38, so that a mixture of air and gas is delivered into the bore 36 through the venturi 38. Air inlet openings (not shown) are provided towards the downstream end of the handle 2 through which air is drawn into the bore 4 of the handle 2 to the air inlet 39. A portion 40 of the heat transfer member 35 slidably engages the bore of the gas supply pipe 23 and the outer dimensions of the portion 40 are such that, although slidable in the gas supply pipe 23, the heat transfer member 35 engages the gas supply pipe 23 with heat conducting engagement. Accordingly, heat from the combustion chamber is conducted through the gas supply pipe 23 into the heat transfer member 35 for in turn heating the nozzle 15 to prevent freezing of gas flowing through the nozzle orifice 19. Thus, the heat transfer member 35 and portion of the gas supply pipe 23 act as the main heat conducting means for conducting heat to the nozzle 15.

Figure 6:
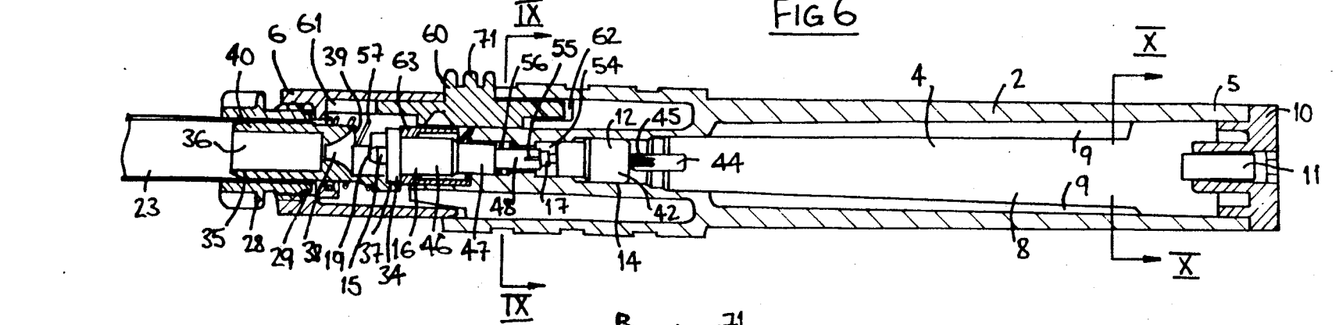
FIG. 6 is a cross sectional view of the gas powered heating tool of FIG. 1 on the line VI—VI of FIG. 3 with the cover removed.
Figure 7:
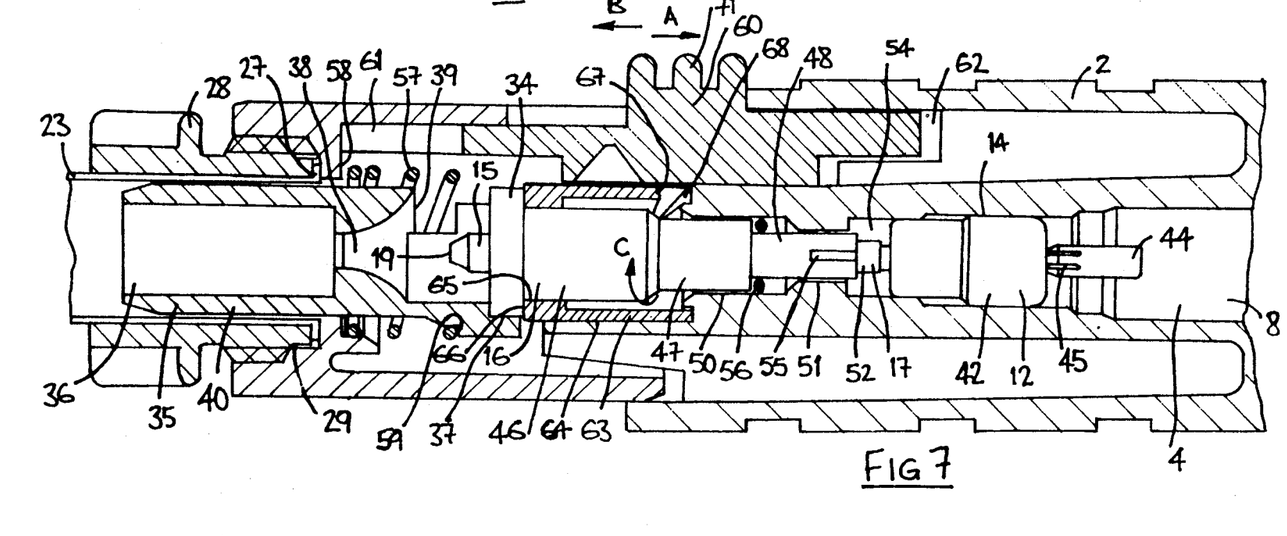
FIG. 7 is a cross sectional view similar to FIG. 6 of portion of the gas powered heating tool of FIG. 1.
Figure 8:
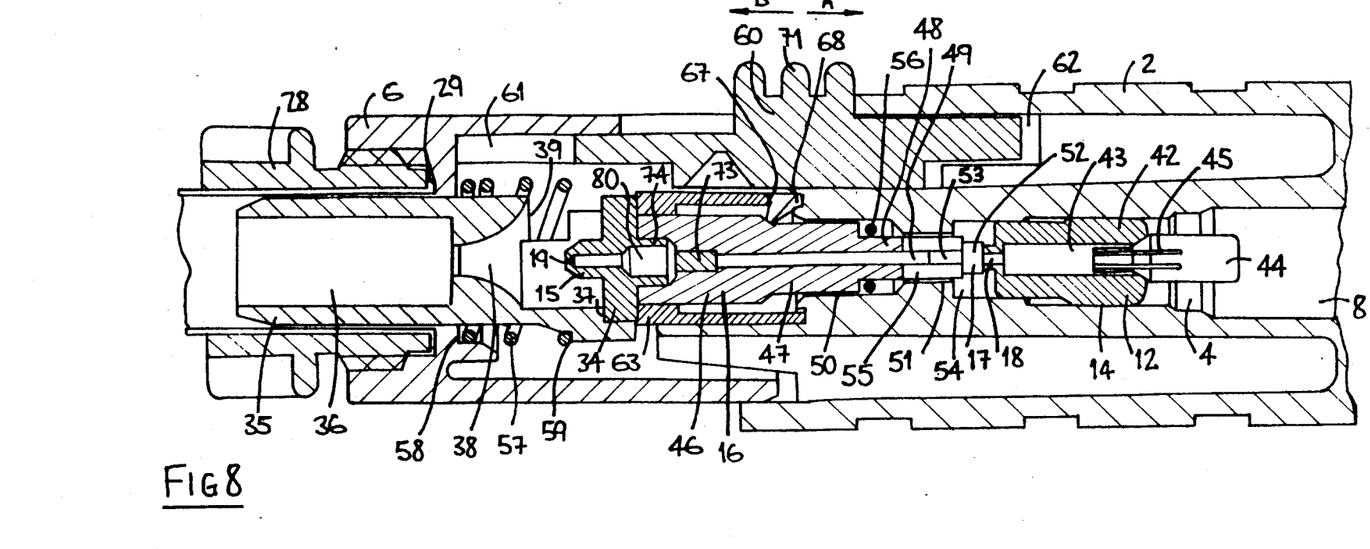
FIG. 8 is a further cross sectional view of the portion of the gas powered heating tool of FIG. 7 with further portions of the gas powered heating tool shown in section.
Figure 10:
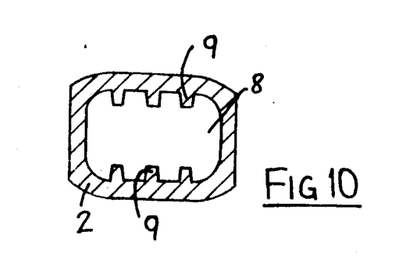
FIG. 10 is a sectional end elevational view of the gas powered heating tool of FIG. 1 on the line X—X of FIG. 6.
Figure 14:
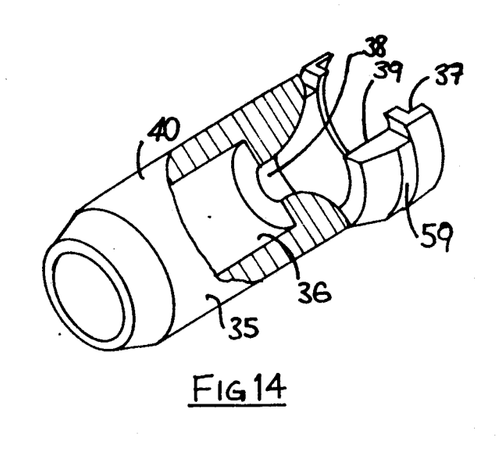
FIG. 14 is a perspective view of another portion of the gas powered heating tool of FIG. 1.
Figure 15:
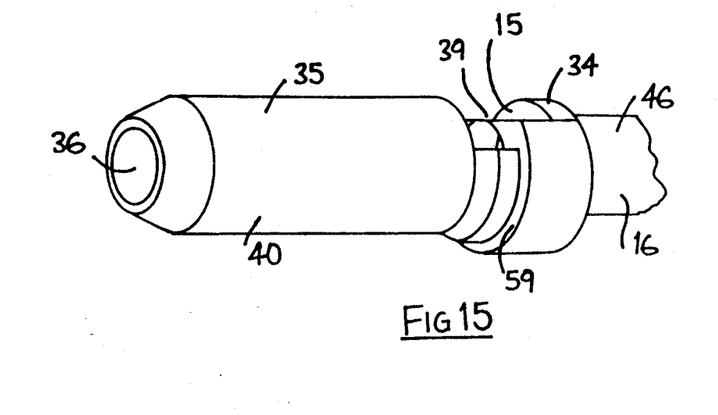
FIG. 15 is a side perspective view of the portion of the gas powered heating tool of FIG. 14.
Figure 16:
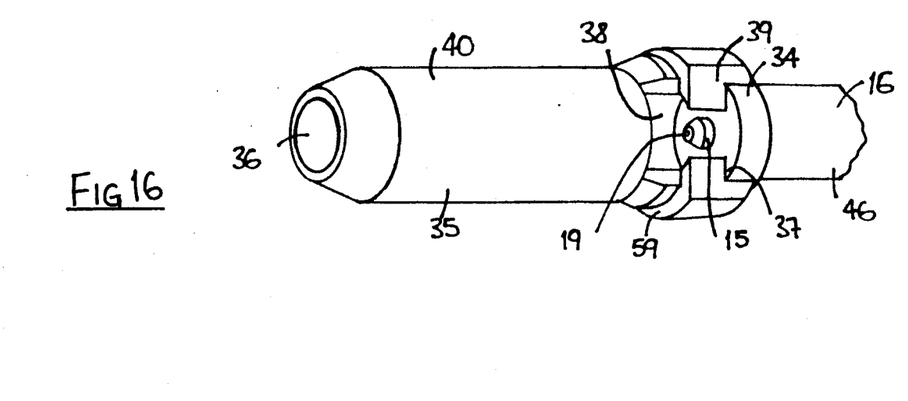
FIG. 16 is a top perspective view of the portion of FIG. 14.
Figure 17:
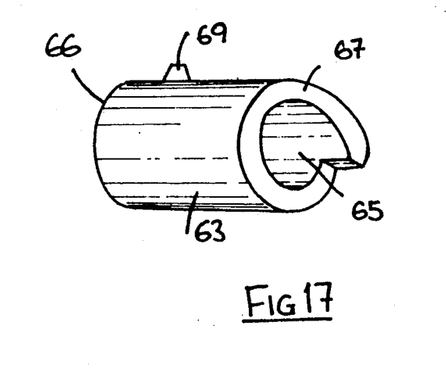
FIG. 17 is a perspective view of another portion of the gas powered heating tool of FIG. 1.
Figure 18:
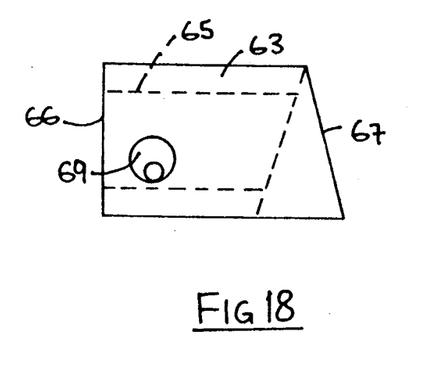
FIG. 18 is a plan view of the portion of FIG. 17.
Figure 19:
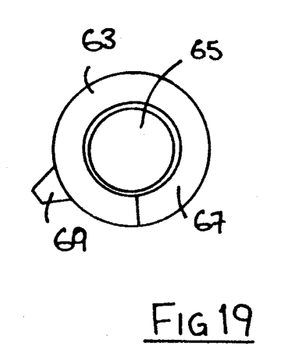
FIG. 19 is an end view of the portion of FIG. 17.
Figure 20:
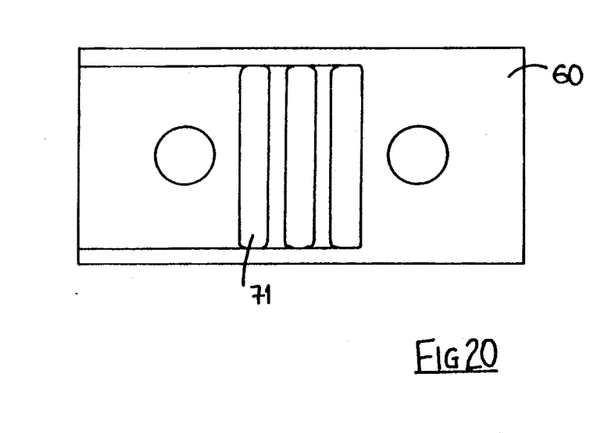
FIG. 20 is a plan view of another portion of the gas powered heating tool of FIG. 1.
Figures 21, 22:
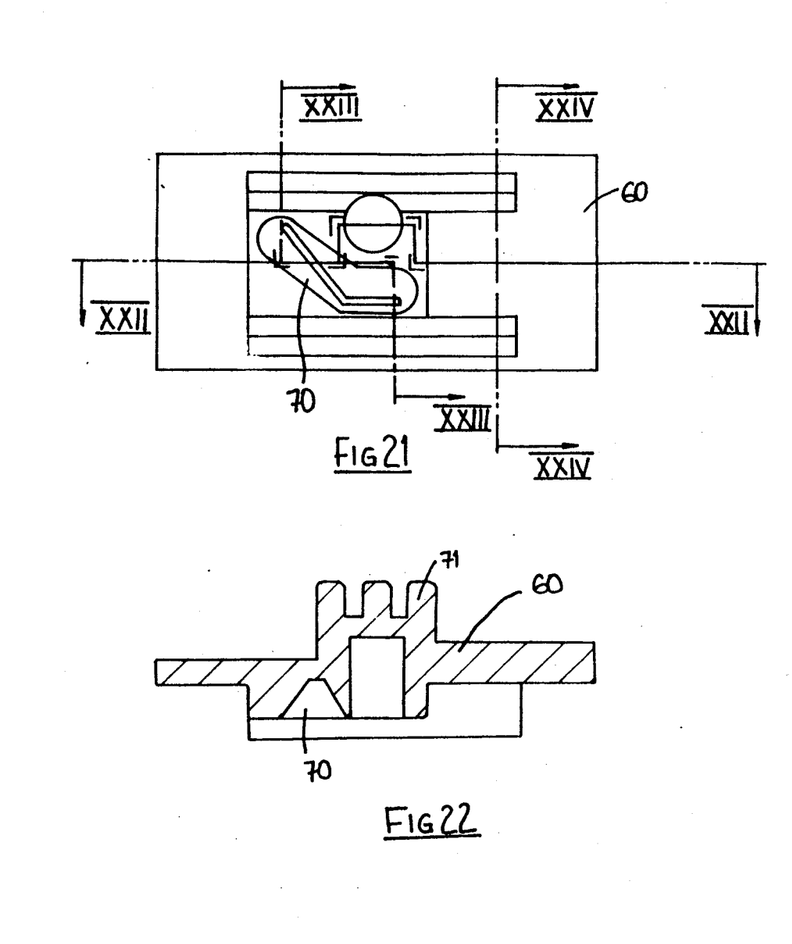
FIG. 21 is an underneath plan view of the portion of FIG. 20.
FIG. 22 is a sectional side view of the portion of FIG. 20 on the line XXII—XXII of FIG. 21.
Figure 23:
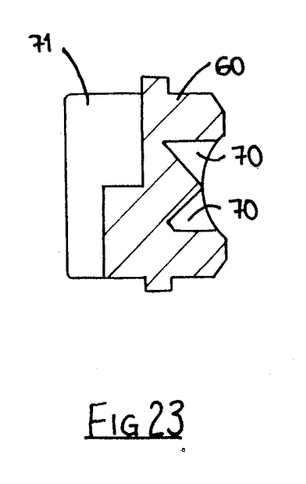
FIG. 23 is a sectional end view of the portion of FIG. 20 on the line XXIII—XXIII of FIG. 21.
Figure 24:
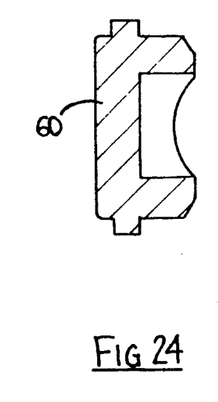
FIG. 24 is a sectional end view of the portion of FIG. 20 on the line XXIV—XXIV of FIG. 21.

Returning now to the evaporator 12 in the handle 2, and referring in particular to FIGS. 6 to 8, the evaporator 12 is a pressure reducer evaporator type No. 1512E sold by Swedish Match, and comprises a housing 42 of brass which is of outer circular cross section. The housing 42 sealably engages the outlet bore 14 from the reservoir 8 with an interference fit. A bore 43 of circular cross section extending into the housing 42 is plugged by a plug 44 of moulded plastics material having a plurality of longitudinal recesses 45 formed on the periphery thereof for permitting but at the same time restricting the flow of fuel from the reservoir 8 into the bore 43 of the evaporator 12. Pressure reducing filters (not shown) are provided in the bore 43 of the housing 42 to further facilitate evaporation of the gas. The outlet 18 formed in the housing 42 extends from the bore 43, and fuel in gaseous form is delivered therefrom under the control of the valving member 18, which will now be described wit reference to the carrier member 16.

The carrier member 16 comprises a main body portion 46, an intermediate body portion 47 and a plug portion 48, all integrally machined from a heat conducting material, namely, brass. A bore 49 extends into and through the carrier member 16 for delivering gas to the nozzle 15. The main body portion 46, the intermediate body portion 47 and the plug portion 48 are all of outer circular cross section. The intermediate body portion 47 and plug portion 48 slidably engage circular portions 50 and 51, respectively, of the bore 4 through the handle 2. The plug portion 48 carries the valving member 17 which is of nitrile material and comprises a disc member 52 and a spigot 53 extending from the disc member 52 which engages the bore 49 in the plug portion 48 with an interference fit. The disc member 52 co-operates with the outlet 18 in the evaporator 12 for selectively delivering and isolating gas from the reservoir 8. On the valving member 17 disengaging the outlet 18, gas flows into a portion 54 of the bore 4, and in turn into the portion 51 of the bore 4. Radial inlet slots 55 through the plug portion 48 communicate the portion 51 of the bore 4 with the bore 49 of the carrier member 16 for delivering gas to the nozzle 15. A sintered material filter 73 is mounted in the bore 49 of the carrier member 16 for filtering the gas being delivered to the nozzle orifice 19. The filter 73 is chosen so that all particles entrained in the gas of a size which could block the nozzle orifice 19 are filtered out of the gas. In this embodiment of the invention, the nozzle orifice 19 is a 55 micron orifice, and the filter is rated as a 10 micron filter. An O-ring seal 56 extending round the plug portion 48 of the carrier member 16 prevents the passage of gas between the carrier member 16 and the bore 4. The O-ring seal 56 is arranged to permit relative sliding of the carrier member 16 in the bore 4. A spigot 74 of brass integrally machined with the nozzle 15 engages the bore 49 of the carrier member 16 with an interference fit for rigidly mounting the nozzle 15 on the carrier member 16. A bore 80 through the spigot 74 and portion of the nozzle 15 communicates the nozzle orifice 19 with the bore 49 for receiving gas from the filter 73.

A compression spring 57 mounted in the bore 4 adjacent the downstream end between a shoulder 58 in the bore 4 and a shoulder 59 on the heat transfer member urges the carrier member 16 in a generally upstream direction, and in turn urges the valving member 17 into engagement with the outlet 18 from the evaporator 12 for isolating gas flow from the reservoir 8.

The carrier member 16 being of a heat conducting material acts as a secondary heat transfer means for transferring some of the heat from the nozzle 15 to the valving member 17 and in turn the evaporator 12 to prevent freezing of gas in any of the components forming the gas supply control means. In other words, the carrier member 16 conducts sufficient heat to the evaporator 12 to prevent freezing of gas in the evaporator 12 or in the outlet 18 from the evaporator 12. Furthermore, by virtue of the fact that the carrier member 16 conducts heat, the bore 49 through the carrier member 16 is maintained at a sufficient temperature to prevent freezing of gas in the bore 49 or the filter 73. In this embodiment of the invention, the handle 2, in the vicinity of the nozzle 15, the carrier member 16 and the evaporator 12 also act as part of the secondary heat transfer means, and some of the heat conducted to the nozzle 15 by the heat transfer member 35 is conducted through the handle 2 to the evaporator 12.

A slider member 60 of plastics material slidable longitudinally in longitudinal grooves 61 and 62 in the handle 2 slides the carrier member 16, the nozzle 15 and valving member 17 in the bore 4 for opening and closing the outlet 18 through a camming member 63. Movement of the slider member 60 in the upstream direction of the arrow A causes the valving member 17 to close the outlet 18, while movement of the slider member 60 in the downstream direction of the arrow B opens the outlet 18.

The camming member 63 is of plastics material of outer circular cross section and is rotatable and slidable in a portion 64 of the bore 4 through the handle 2. A bore 65 of circular cross section extends through the camming member 63 and rotatably engages the main body portion 46 of the carrier member 16. One end 66 of the camming member 63 abuts the circular flange 34 of the nozzle 15. The opposite end of the camming member 63 terminates in a partly helical camming face 67 which engages a corresponding partly helical camming face 68 formed in the portion 64 of the bore 4 so that on rotation of the camming member 63 in the direction of the arrow C around the carrier member 16, the carrier member 16 is moved in a generally downstream direction for disengaging the valving member 17 from the outlet 18. A spud 69 extending from the outer surface of the camming member 63 engages a guide slot 70 in the slider member 60, so that movement of the slider member 60 in the direction of the arrow B rotates the camming member in the direction of the arrow C, thereby opening the outlet 18 of the evaporator 12. Movement of the slider member 60 in the reverse direction, namely, in the direction of the arrow A, causes the camming member 63 to rotate in the reverse direction, thereby moving the carrier member 16 in a generally upstream direction under the action of the compression spring 57. A thumb grip 71 on the slider member 60 extends through a longitudinally extending slot 72 in the handle 2. The slot 72 is of sufficient length to facilitate longitudinal sliding of the slider member 60 in the direction of the arrows A and B.

A cover 75 of plastics material slidably and releasably engages a portion 76 of the handle 2, see FIGS. 1 and 2. Ribs (not shown) are provided on the portion 76 of the handle 2 for engaging corresponding internally formed grooves (not shown) in the cover 75 so that the cover 75 is releasably retained on the handle 2 with a snap fit action. The slider member 60 for operating the carrier member 16 and in turn the valving member 17 is positioned in the handle 2 so that when the cover 75 is fully engaged on the portion 76 of the handle 2 the slider member 60 is moved by the cover 75 into the off position. A flint igniter mechanism 77 is mounted in the cover 75 for igniting the gas and in turn the catalytic heating element 26 in the combustion chamber 25. Thumb wheels 78 operate the flint igniter mechanism 77.

The gas powered heating tool with the cover 75 in place is of size and dimension suitable for fitting in one's pocket. In this embodiment of the invention, the overall length of the tool, including the cover, is 196 mm, while the width of the tool at its widest point is 26 mm and the thickness of the tool at its widest point is 19 mm.

The head 3b illustrated in FIG. 13 is identical to the head 3a illustrated in FIGS. 11 and 12, with the exception that the tool element in this case is a knife 79 which is heated by the catalytic heating element 26 in the combustion chamber 25. The knife 79, when heated, may be used for, for example, cutting plastics materials, ropes of plastics material and the like. A gland nut identical to the gland nut 28 secures the gas supply pipe 23 of the head 3b to the handle 2 in similar fashion as the head 3a is secured to the handle 2.

In use, the reservoir 8 is charged with liquid gas, in this case, butane, through the filling valve 11. The cover 75 is removed and the appropriate head 3 is secured in the handle 2 by the gland nut 28. The gas powered heating tool 1 is switched on by sliding the slider member 60 in the direction of the arrow B, thereby disengaging the valving member 17 from the outlet 18. Fuel gas in liquid form flows from the reservoir 4 through the longitudinal recesses 45 into the bore 43 of the evaporator 12. As the fuel passes through the evaporator 12, the fuel gas begins to vaporise. The fuel gas in gaseous form exits through the outlet 18 of the evaporator 12. The gas passes through the bore 54 and in turn through the radial slots 55 and into the bore 49 of the carrier member 16. The gas is filtered by the filter 73 in the carrier member 16 and in turn is delivered as a jet through the nozzle orifice 19. On exiting through the nozzle orifice 19, the jet of gas draws air through the air inlet 39, which is mixed with the gas jet in the venturi 38. The mixture of gas and air is delivered through the bore 36 of the heat transfer member 35 into the gas supply pipe 23 where it is then delivered into the bore 30 of the catalytic heating element 26. The air and gas mixture passes radially through the catalytic heating element 26 and in turn through the exhaust outlet slots 32. The gas passing through one of the slots 32 may be ignited by the flint igniter 77 or by any other suitable ignition means, such as, for example, a naked flame of a match or the like. The exhaust slots are shaped and sized so that the gas burns with a flame, the root of which sits in the exhaust outlet slot on the catalytic heating element 26. This raises the temperature of the catalytic heating element 26 in the area of the flame to its ignition temperature and thus causes the catalytic heating element 26 to convert the gas to heat in this area. As the gas is converted to heat in the catalytic heating element 26, the flame extinguishes. The remainder of the catalytic heating element 26 quickly raises to its ignition temperatureand accordingly continuously converts gas over its entire area to heat. The heat is thus conducted from the combustion chamber 25 to the tool element 20. Heat is also conducted from the combustion chamber 25 through the gas supply pipe 23 and the heat transfer member 35 to the nozzle 15 to prevent freezing of the gas in the nozzle orifice 19. Some of the heat conducted by the heat transfer member 35 to the nozzle 15 is further conducted by the carrier member 16 to the valving member 17 and the evaporator 12 to prevent freezing of gas passing through the evaporator 12 and the outlet 18. Some heat conducted by the heat transfer member 35 to the nozzle 15 is also conducted through the handle 2 to the evaporator 12.

To switch off the heating tool, the slider member 60 is moved in the direction of the arrow A, thereby moving the valving member 17 to close the outlet 18 to shut off the supply of gas from the reservoir 8.

In practice, when the heating tool is operating normally, gas is delivered through the orifice 19 at a rate of between 1 and 2 grammes per hour.

The advantages of the invention are many, however, a particularly important advantage of the invention is that, irrespective of the rate at which gas is drawn through the nozzle orifice 19, freezing of gas in the nozzle orifice is avoided. This is achieved by virtue of the fact that heat is conducted from the combustion chamber 25 to the nozzle 15 through the gas supply pipe 23 and the heat transfer member 35. A further advantage of the invention is that by virtue of the fact that the carrier member and the handle conduct heat to the evaporator 12 and the valving member 17, freezing of gas through the evaporator, the outlet from the evaporator and the carrier member 16 is avoided. A further advantage of the invention is achieved by virtue of the fact that the nozzle 15 and the nozzle orifice 19 are placed in the handle 2. Since the nozzle 15 is mounted remotely of the combustion chamber, the portion of the nozzle member defining the nozzle orifice is not damaged by excessive heat from the combustion chamber which would occur if the nozzle was provided adjacent the combustion chamber. Providing the nozzle in the handle also provides the added advantage that heads of the heating tool can readily easily be removed and replaced without any damage being caused to the nozzle or to the head. These advantages are achieved without any danger of the gas freezing in the nozzle orifice, as a result of the fact that the nozzle orifice is remotely mounted of the combustion chamber.

While the gas powered heating tool has been described as comprising a head having a tool element in the form of a soldering tip and a heated knife, it will be readily apparent to those skilled in the art that other heads with other tool elements may be provided. For example, it is envisaged that a tool head which comprises a desoldering tool element may be provided, the tool element may be in the form of a hot air blower or the like.

It will of course be appreciated that other suitable evaporators and other valve means as well as other nozzles may be provided. Any other suitable gas supply control means may be provided. Further, while the handle has been described as forming a refillable reservoir, this is not essential, indeed, where the handle does form a reservoir, it is not essential that the reservoir should be refillable, and needless to say, in many cases, the reservoir may be dispensed with. Where the handle does form a reservoir, other suitable shapes and construction of handle may be provided. It will of course be appreciated that it is not necessary for the carrier member to carry the valving member. An independently mounted valving member may be provided.

While the main heat transfer means for conducting heat from the combustion chamber to the nozzle has been described as being formed by a heat transfer member of tubular shape and by the gas supply pipe, this is not essential. The heat transfer means may be provided by a heat transfer member or members of any other shape and construction. Needless to say, in certain cases, it will be appreciated that the heat transfer member, instead of being slidably mounted, may be rigidly mounted, and in which case, the nozzle, if slidable, would be slidable in the heat transfer member. Alternatively, where the nozzle is rigidly mounted in the handle, then needless to say the heat transfer member could likewise be rigidly mounted.

The heat transfer member may be of any other material which is suitable for conducting heat. While the secondary heat transfer means has been described as the carrier member, any other suitable secondary transfer means for transferring heat to the gas supply control means may be provided, and indeed, in certain cases, the secondary heat transfer means may be dispensed with. Furthermore, while the secondary heat transfer means has also been described as being partly formed by the handle, this, while it is advantageous, is not essential. Furthermore, in certain cases, it is envisaged that the handle may solely form the secondary heat transfer means. It is envisaged that the carrier member, when forming the secondary heat transfer means, may be of any other suitable material with a capacity to conduct heat. Indeed, in certain cases, it is envisaged that the carrier member may be of a plastics material. It is also envisaged that the carrier member and the nozzle may be of a plastics material, provided the plastics material had the capacity to conduct heat, even with a relatively low heat conducting capacity.

It will of course be appreciated that a gas supply pipe of other shape and construction may be provided. Furthermore, other constructions of head may be provided.

While the combustion chamber has been described as being formed by portion of the gas supply pipe, the combustion chamber may be independently formed of the gas supply pipe, and where the combustion chamber is formed in the gas supply pipe, the combustion chamber may be formed at any suitable location in the gas supply pipe. Needless to say, the combustion chamber may be of any other suitable shape or size. It is envisaged that other catalytic heating elements may be used besides that described, and it will of course be appreciated that the catalytic heating element may be of any other shape and construction, and while it is preferable, it is not essential that the catalytic heating element should be of tubular construction.

Further, it is envisaged that exhaust outlet means other than elongated slots may be provided, and in certain cases, a single exhaust outlet would be sufficient. It is, however, believed that optimum results are achieved when the exhaust outlet is provided in the shape of a slot and the length of the slot is in the range of 5 mm to 15 mm and the width of the slot is in the range of 2 mm to 5 mm. Further, in order to facilitate the root of the flame sitting on the catalytic heating element for raising the catalytic heating element to its ignition temperature, it is preferable that the wall thickness of the combustion chamber should be relatively thin. The preferred wall thickness is 0.25 mm, however, it is envisaged that good results would be achieved provided the wall thickness was maintained within the range of 0.10 mm to 1.0 mm. The main benefit of providing an exhaust outlet of length and width within the range set out above and a combustion chamber of wall thickness in the range set out above is that it facilitates rapid ignition of the catalytic heating element. Once the above dimensions are maintained within the ranges set out above, the root of the flame formed by igniting the gas in the exhaust outlet tends to sit on the catalytic element for raising its temperature to the ignition temperature.

Other suitable operating means for sliding the nozzle member and the valving member may be provided.

We claim:

1. A gas powered heating tool comprising:
   a handle,
   a tool element connected to the handle,
   a combustion chamber mounted adjacent the tool element for heating the tool element,
   a catalytic heating element mounted in the combustion chamber for converting gas to heat,
   a gas supply pipe extending from the combustion chamber, the gas supply pipe having a bore for accommodating gas to the combustion chamber,
   a nozzle for delivering gas to the combustion chamber through the gas supply pipe, and
   main heat transfer means of heat conducting material engageable with the nozzle with heat conducting engagement, the main heat transfer means extending from the nozzle into the bore of the gas supply pipe for transferring heat from the combustion chamber to the nozzle to prevent freezing of gas passing therethrough.

2. A gas powered heating tool as claimed in claim 1 in which the nozzle is mounted in the handle.

3. A gas powered heating tool as claimed in claim 1 in which the main heat transfer means comprises an elongated heat transfer member slidable in the bore of the gas supply pipe.

4. A gas powered heating tool as claimed in claim 3 in which the heat transfer member is a tubular member having a bore extending therethrough for delivering gas from the nozzle.

5. A gas powered heating tool as claimed in claim 4 in which a venturi is formed in the bore of the heat transfer member, the nozzle being located upstream of the venturi, an air intake means being provided to the bore of the heat transfer member, intermediate the nozzle and the venturi.

6. A gas powered heating tool as claimed in claim 3 in which the gas supply pipe supplying gas to the combustion chamber acts as part of the main heat transfer means and is of heat conducting material, the heat transfer member engaging the gas supply pipe with heat conducting engagement.

7. A gas powered heating tool as claimed in claim 1 in which gas supply control means for controlling the gas supply to the nozzle is provided in the handle, secondary heat transfer means being provided for transferring heat from the main heat transfer means to the gas supply control means to prevent freezing of gas passing through the gas supply control means.

8. A gas powered heating tool as claimed in claim 7 in which the secondary heat transfer means carries the nozzle and the gas supply control means.

9. A gas powered heating tool as claimed in claim 7 in which the gas supply control means comprises a valving member for controlling the supply of gas to the nozzle, the secondary heat transfer means, the nozzle and the valving member being slidable in the handle for controlling the supply of gas to the nozzle.

10. A gas powered heating tool as claimed in claim 7 in which the handle acts partly as the secondary heat transfer means.

11. A gas powered heating tool as claimed in claim 1 in which the gas supply pipe is releasably engagable with the handle and extends therefrom.

12. A gas powered heating tool as claimed in claim 1 in which a portion of the gas supply pipe adjacent a distal end thereof remote from the handle forms the combustion chamber, and the tool element is engagable with the distal end of the gas supply pipe to form therewith the combustion chamber.

13. A gas powered heating tool as claimed in claim 1 in which an exhaust outlet means is provided from the combustion chamber, the exhaust outlet means being provided by an elongated exhaust outlet slot, the elongated slot being of width in the range of 2 mm to 5 mm and length in the range of 5 mm to 15 mm.

14. A gas powered heating tool as claimed in claim 13 in which the thickness of the wall of the combustion chamber defining the exhaust outlet slot is in the range of 0.1 mm to 1 mm.

15. A gas powered heating tool as claimed in claim 1 in which the tool element is a soldering tool element.

16. A gas powered heating tool as claimed in claim 1 in which the tool element is a desoldering tool element.

17. A gas powered heating tool as claimed in claim 1 in which the tool element is a knife.

18. A gas powered heating tool as claimed in claim 1 in which the tool element is a warm air delivery nozzle.

19. A head for a gas powered heating tool, the heating tool comprising a handle, a nozzle through which gas is delivered mounted in the handle, and a main heat transfer means of heat conducting material engageable with the nozzle with heat conducting engagement for transferring heat to the nozzle, the head comprising a tool element, a combustion chamber mounted adjacent the tool element for heating the tool element, a gas catalytic combustion heating element mounted in the combustion chamber for converting gas to heat, a gas supply pipe extending from the combustion chamber and having a bore for accommodating gas from the nozzle to the combustion chamber, and for accommodating the main heat transfer means, the gas supply pipe comprising releasable connecting means for releasably connecting the head to the handle of the gas powered heating tool.

* * * * *